W. L. IMLAY.
APPARATUS FOR RECOVERING GOLD AND SILVER BY USE OF CYANID SOLUTIONS.
APPLICATION FILED FEB. 16, 1911.
1,014,224.
Patented Jan. 9, 1912.
2 SHEETS—SHEET 2.
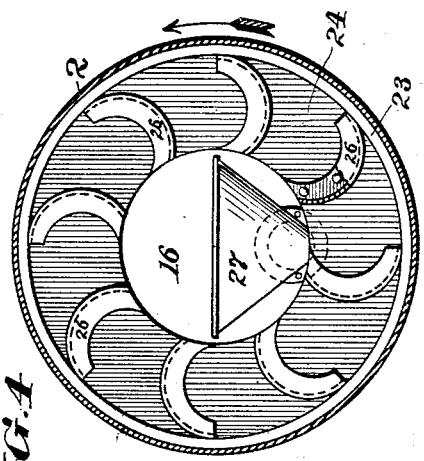
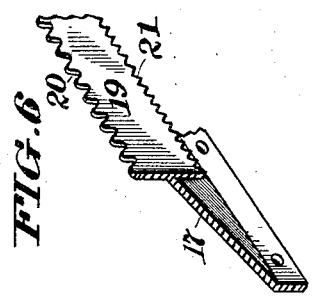
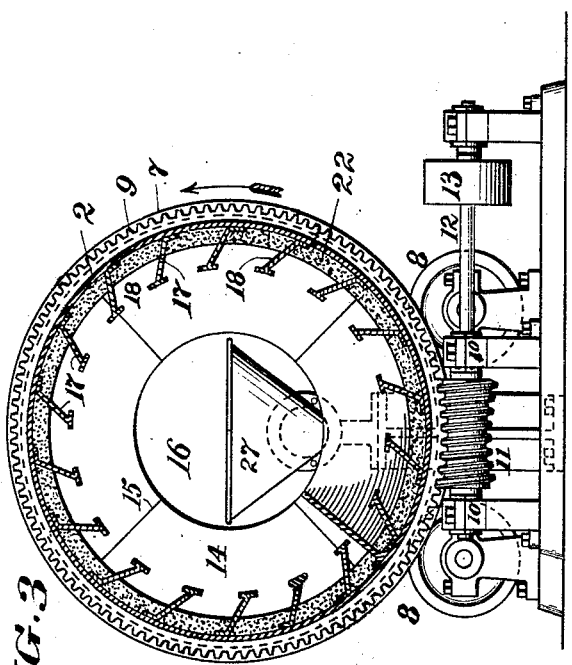
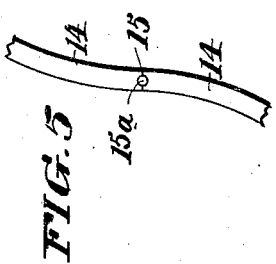
Witnesses
Daniel Webster, Jr.
R. M. Kelly
Inventor
William L. Imlay
By
Attorney

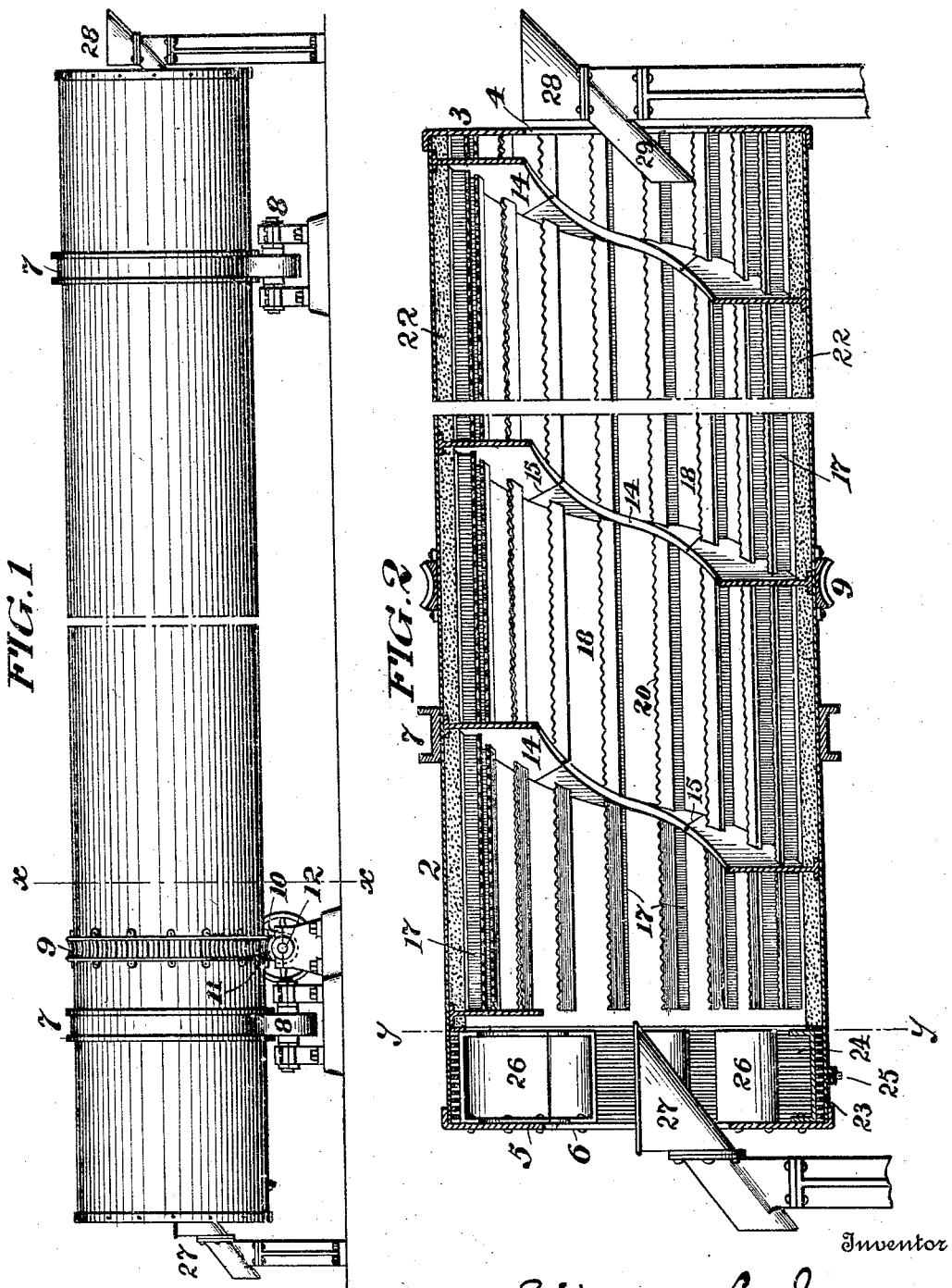

UNITED STATES PATENT OFFICE.

WILLIAM L. IMLAY, OF PHILADELPHIA, PENNSYLVANIA.

APPARATUS FOR RECOVERING GOLD AND SILVER BY USE OF CYANID SOLUTIONS.

1,014,224.  Specification of Letters Patent.  Patented Jan. 9, 1912.

Application filed February 16, 1911. Serial No. 609,003.

*To all whom it may concern:*

Be it known that I, WILLIAM L. IMLAY, a citizen of the United States, and resident of Philadelphia, county of Philadelphia, State of Pennsylvania, have invented an Improvement in Apparatus for Recovering Gold and Silver by Use of Cyanid Solutions, of which the following is a specification.

My invention has reference to apparatus for recovering gold and silver by use of cyanid solutions and consists of certain improvements which are fully set forth in the following specification and shown in the accompanying drawings which form a part thereof.

More particularly, my invention has for its object economy in the cost of recovery of the finer values of the ores, greater rapidity of the recovery and less cost and space required in the equipment of a cyanid plant.

In plants for recovery of gold and silver by use of a solution of a cyanid of the alkalies, it has been customary to treat the ores in a more or less pulverized condition to a weak solution cyanid of potassium in a stamp battery, subject the pulp to hydraulic classification, regrind and concentrate the spigot product of the classifiers, treat the tailings from the concentrating tables and vanners to further classifications to separate the sands from the slimes, treat the sands to a lengthy leaching in cyanid solution, treat the slimes to agitation, and decantation to obtain a clear cyanid solution containing the gold and silver values, subjecting the slimes to filtration to extract the cyanid solution containing the gold and silver values, and finally precipitate the gold and silver values by passing the clear cyanid solutions through the zinc boxes in the usual manner. These steps are to some extent varied or modified to suit the character of the ores, in some cases providing for amalgamation with or without concentration.

In employing my improvements in a cyanid plant, it is my object to greatly reduce the time required in leaching the ores and to eliminate much of the extensive apparatus heretofore employed in that department.

In a plant employing my invention, the preliminary treatment of the ores may follow the most approved null practice to suit the particular character of the ore, but after the said treatment, whether it be pulverizing in the stamp battery with or without cyanid of potassium solution, and followed by treating the pulp or ore, as the case may be, to amalgamation or otherwise, the ore in the condition of pulverization guaranteed by the screen mesh employed with the stamp battery, is either reground and fed, or directly fed, with cyanid of potassium solution into my improved lixiviating apparatus (hereinafter fully described) in which it is subjected to a thorough lixiviation with agitation and aeration in a continuous manner and in a limited space, considering the actual time of treatment. From the said lixiviating treatment the slimes are separated from the sands or tailings and transferred to the slimes department for precipitation of the values contained therein and the sands may be drained and passed to the tailings dump without further cyaniding treatment (unless otherwise desired from the special nature of the ores).

By use of my invention, it is not necessary to employ the expensive hydraulic classification equipments heretofore used, nor the usual costly leaching outfits. It is further to be pointed out that I am enabled to dispense with a large proportion of the cyanid solution vats or tanks heretofore required, as, by my invention, greatly less working volumes of cyanid solution are required for the extraction of the values from the ores and hence less containers therefor are necessary.

My invention more particularly consists in the employment at some point, between the stamp battery and the slimes department, of the lixiviating apparatus embodying my improvements, the said apparatus comprising a slowly rotating cylinder having one end arranged for receiving the pulverized ore and cyanid solution and the other end arranged for the automatic delivery of the pulp containing the slimes, sands and solution, the said cylinder having upon its interior wall a helical inwardly extending flange supplemented by a plurality of longitudinal inwardly directed ribs or bucket structures, which operate, during its rotation, to slowly convey the contents from the feeding to the discharge end of the cylinder and at the same time to carry up the pulp and spill it downward through the air with resulting splash, thereby subjecting the pulp and cyanid solution to agitation and aeration and thereby producing leaching so effectively that the finer values are dissolved out of the pulp with great rapidity.

My invention also comprehends details of construction which, together with the features above set forth, will be better understood by reference to the drawings, in which:—

Figure 1 is a side elevation of a lixiviating cyaniding apparatus embodying my invention; Fig. 2 is a longitudinal section of the same; Fig. 3 is a cross sectional view of the same taken on line $x$—$x$ of Fig. 1; Fig. 4 is a cross sectional view of the same on line $y$—$y$ of Fig. 2; Fig. 5 is an edge view of one part of the helical flange showing the joint therein; and Fig. 6 is a perspective view of a portion of one of the bucket ribs.

2 is a horizontal sheet steel cylinder 30 to 70 feet in length, as may be necessary to provide the time of treatment required to suit the class of ores subjected to the cyanid leaching. This cylinder has its feeding end 3 closed except for a central opening 4, and likewise has its discharge end 5 closed except for the central opening 6. The cylinder 2 may be provided with a plurality of cylindrical guides 7 about its outside which rest upon supporting and guide wheels 8 and upon which it may be rotated. It is immaterial how the rotation may be imparted to the cylinder, but I prefer to belt it with a worm wheel 9 which engages a worm 11, the latter secured to a rotatable shaft 12 driven by a band pulley 13. The shaft is journaled in suitable bearings 10. By rotating the worm, the cylinder is caused to rotate slowly and with a steady motion which avoids excessive strains upon the long cylinder or upon its means of support.

The ore or pulp associated with the cyanid of potassium is delivered into a hopper 28 and, by a spout 29, is fed into the end of the cylinder through the opening 4. The treated product at the discharge end of the cylinder is delivered into the hopper 27 arranged within the opening 6 and by it conveyed outside of the cylinder. The interior of the cylinder is provided with a helical inwardly directed flange 14, the pitch of the same being preferably about three feet so that with each revolution of the cylinder the body of the pulp will be advanced a distance of three feet. It is evident that, by reducing the pitch of the helical flange, the relative rate of speed of travel of the pulp may be varied to suit the requirements of the ore to be treated. This helical flange 14 is best made in sections for commercial reasons in the manufacture; and as it is desirable that the pulp shall not flow through the joints so formed, I prefer to provide the abutting flange sections with a packed joint, the same to be made in any suitable manner. In the particular form of packed joint shown I provide a radial aperture formed between the abutting ends of the sections and in said hole I place lead or other suitable packing 15$^a$. I do not restrict myself in this respect as any form of reasonably tight joint may be employed.

It will now be understood that, by reason of the inward helical flanges the pulp will be divided into separate bodies and will only be permitted to flow from the feeding end to the discharge end at a speed commensurate with the pitch of the helix and the speed of rotation of the cylinder, and even this may be reduced somewhat from certain retarding effects produced upon the feeding incident to the agitation and aeration process, as more fully explained later on.

The interior walls of the cylinder are further provided with internal buckets 18 preferably formed by longitudinal ribs 17 extending between the helical flanges, the form or shape of these ribs being best understood from Figs. 3 and 6. These ribs are preferably arranged in an oblique angle to the interior wall of the cylinder to form the grooved pockets or buckets 18 (Fig. 3) and the inner edges of these ribs may have a T shaped construction formed by a flange 19, preferably with coarse serrations 20 at the advancing edge and finer serrations 21 at the trailing edge (Fig. 6). These serrations cause the pulp to subdivide in overflowing from the buckets 18 and to be caused to fall in spray or small streams and thereby become more thoroughly aerated and agitated.

The inner wall of the cylinder 2 is preferably lined with cement as indicated at 22, preferably of about two to three inches in thickness and the ribs 17 project inwardly beyond the cement for about an equal amount. These ribs may also be spaced from two or three inches apart, though for clearness I have shown them somewhat farther apart in the drawings. I also prefer the diameter of the cylinder to be about four feet and the depth of the helical flange to be about one foot so as to provide a central longitudinal clear passage 16 of between eighteen and twenty-four inches in diameter that there may be no lack of aeration to the whole treatment and also to provide for easy access of workmen in case of repairs.

It will be now understood that, according to the pitch of the helix, more or less of the dropping pulp from the buckets 18 will find its way back of the rear helical wall of any body of the pulp, as will be more readily perceived by considering a vertical line from the right hand ends of any of the ascending buckets in Fig. 2, and this backward feeding or transference of the pulp acts as a retarding influence in the travel of the material through the cylinder and in a substantial measure increases the lixiviating treatment given to the pulp in its passage through the cylinder.

The discharging end of the cylinder is formed with the compartment 24 containing the discharging buckets 26 for picking up the pulp and solution and delivering it to the discharge hopper 27 as will be readily understood by reference to Figs. 1 and 4. In case it is desired to perform an amalgamating operation upon the coarser values of the ore before being discharged from the cylinder the chamber 24 may be supplied with mercury which may be received in annular grooves formed between the circumferential iron ribs 23, the latter being between the buckets 26 and the shell of the cylinder. The heavier metallic portions of the pulp will, by reason of their greater specific gravity, pass downward into these grooves and be treated to amalgamation and in due time the amalgam may be drawn off through a nozzle 25, normally closed with a screw plug.

As an example to show the great amount of treatment received by the pulp in passing through the lixiviating cylinder the following figures are significant: The length of the cylinder being, say, fifty feet and the pitch of the spirals three feet, there will be sixteen subdivisions or bodies of the pulp simultaneously passing through the apparatus, each body of approximately 3000 to 4000 pounds. The cylinder may make one to five revolutions per minute, so that any of these bodies of pulp will be 10 to 16 minutes in passing through the machine due to the helical propulsion; but as there is about one-third retardation, for reasons already explained, the actual time of treatment would be from 13 to 22 minutes. Moreover it is evident that the pulp may be returned for retreatment, if so desired, and especially so if the cylinder is speeded up, a result which would greatly increase the treatment to aeration and agitation in a given period of time. In other words, assuming a definite period of time being required for the leaching, this operation may be carried on in the same apparatus under different degrees of effective agitation and aeration, with a resultant reduction in the size of plant required. It is to be understood that, if desired, two or more of these lixiviating cylinders may be employed in the same plant, the pulp passing from the discharge of one cylinder into the feeding end of the next; and as these may be arranged side by side or end to end and only at about two feet difference in elevation, it is evident that the plant would not have to be built on the side of a steep hill, a requirement which often entails considerable difficulty in establishing good milling operations within a reasonable outlay in cost. If the cylinders were on the same level, a small bucket wheel elevator or ordinary rotary circulating pump would suffice for the transference of the pulp from one cylinder to the next.

The supply of oxygen and ozone is secured for the cyanid solution and the agitation insured, both in the body of the pulp in the bottom of the cylinder and also in the sprayed pulp, by the presence of the bucket ribs 17, because of their action as buckets, spilling their contents from bucket to bucket and through the air into the liquid mass below, and because of their action as paddles or riffles in passing down into, transversely through and then upwardly out of the pulp which thoroughly agitates the same. Moreover by examining Fig. 3, it will be seen that the descending ribs 17 carry large bodies of air down below the body of pulp and cause said air to bubble up through the same during the agitation; and the serrated edges 20 act to subdivide the said air to an effective condition so as to provide innumerable bubbles. It will also be seen that as the confined air is conveyed below the pulp it is put under pressure and this insures a more intimate contact with the cyanid solution in the presence of the values to be dissolved thereby increasing the speed of action.

Further agitation, grinding and rubbing action, to assist in the breaking of the bubbles or films of hydrogen gas which invariably develop and are ever present when gold and silver are attacked by cyanid solutions, may be had by the use of pebbles which can be placed in the cylinder with the pulp and which will be carried up with the pockets or buckets 18 and dropped into the fluid below to cause a pronounced splash. These pebbles may be used over and over again until too much worn to have the desired size.

While I have shown my cylinder with the ribs 17 and pockets 18, it is to be understood that, in some cases, I may dispense with said ribs or at least with them acting as pockets and rely upon the agitation produced by sufficient pebbles in conjunction with the pulp, the pebbles to be separated at the discharge end by passing over a grating and to be used over again, repeatedly.

My invention may be used directly with crushed ore when the same is of a sufficiently porous character and the gold in a very subdivided condition, but ordinarily the ore would be subjected to the pulverizing action of a stamp battery in cyanid solution and the pulp passing through a 10 to 12 mesh screen delivered to a Huntington, Chilian, Ball or other pulverizing mill and further ground to pass a 30 or 40 mesh screen before passing to the lixiviator embodying my improvements, but I do not limit or restrict myself in these particulars, as my invention is applicable for use at any stage of a cyanid process where lixiviation or leaching is required in order to dissolve out the initial values.

Having now described my invention what I claim as new and desire to secure by Letters Patent is:—

1. In an apparatus of the character described, the combination of a substantially horizontal cylinder having an inlet at one end and a discharge at the other end and also provided on its interior with a helical flange secured to its interior side wall and of a depth less than the radius of the cylinder to provide a central passage through the same and divide the materials being treated into a plurality of separate bodies and also having a plurality of bucket devices arranged upon its inner walls between the helical flanges for lifting and spilling the contents being treated, means to rotate the cylinder slowly, means for delivering materials to the inlet end of the cylinder, and means for delivering the materials from the discharge end.

2. In an apparatus of the character described, the combination of a substantially horizontal cylinder having an inlet at one end and a discharge at the other end and also provided on its interior with a helical flange secured to its interior side wall and of a depth less than the radius of the cylinder to provide a central passage through the same and divide the materials being treated into a plurality of separate bodies and also having a plurality of longitudinal parallel inwardly directed ribs forming bucket devices arranged upon its inner walls between the helical flanges and abutting thereupon for lifting and spilling the contents being treated, means to rotate the cylinder slowly, means for delivering materials to the inlet end of the cylinder, a cement lining to the interior of the cylinder and forming fluid tight joints between the said cylinder and the helical flange and said flange and the longitudinal parallel ribs, and means for delivering the materials from the discharge end.

3. In an apparatus of the character described, the combination of a cylinder having an inlet at one end and a discharge at the other end and also provided on its interior with a helical flange secured to its interior side wall and of a depth less than the radius of the cylinder to provide a central passage through the same and a plurality of longitudinal inwardly directed ribs having serrated flanges at their free edges and forming bucket devices arranged upon its inner walls between the helical flanges for lifting and spilling the contents being treated, means to rotate the cylinder slowly, means for delivering materials to the inlet end of the cylinder, and means for delivering the materials from the discharge end.

4. In an apparatus of the character described, the combination of a cylinder having an inlet at one end and a discharge at the other end and also provided on its interior with a helical flange secured to its interior side wall and of a depth less than the radius of the cylinder to provide a central passage through the same and a plurality of bucket devices arranged upon its inner walls between the helical flanges for lifting and spilling the contents being treated and also having an annular chamber adjacent to the discharge end for holding amalgamating mercury, means to rotate the cylinder slowly, means for delivering materials to the inlet end of the cylinder, and means for delivering the materials from the discharge end.

5. In an apparatus of the character described, a substantially horizontal rotatable cylinder having a central aperture through the same to permit free passage of air from the outside and further having upon its interior wall a helical flange for dividing the fluid contents at the lower part into separate bodies, and a plurality of longitudinal buckets arranged upon the interior wall between adjacent flange portions of the helical flange, combined with means to rotate the cylinder.

6. In an apparatus of the character described, a rotatable cylinder having upon its interior walls means for elevating and spilling the materials being treated to splash the same and means to control the speed of flow of the materials longitudinally through the cylinders, combined with a support, and means to rotate the cylinder.

7. In an apparatus of the character described, a rotatable substantially horizontal cylinder having upon its interior walls means for elevating and spilling the materials being treated to splash the same and means to mechanically propel the materials along the lower interior part of the cylinder and to control the flow of the materials longitudinally through the cylinder commensurate with the speed of rotation thereof, said means for elevating and spilling the materials subjecting the material being spilled to a backward travel during the time the material in the bottom of the cylinder is being given a forward travel and said backward travel being less than the forward travel.

8. In an apparatus of the character described, a substantially horizontal rotatable cylinder having upon its interior walls means for elevating and spilling the materials being treated to splash the same and means consisting of a deep helical flange to propel and produce a controlled flow of the materials longitudinally through the cylinder and in the path of the splash, combined with a support, and means to rotate the cylinder.

9. In an apparatus of the character described, a rotatable cylinder having an inlet at one end and an outlet at the other and having its interior provided with means to cause the materials to be treated to be passed in separate bodies longitudinally through the cylinder at a speed commensurate with the rotation thereof and also having its interior wall provided with longitudinal buckets for the dual purpose of raising and spilling the materials and feeding it backward and for carrying the air down under the materials within the lower part of the cylinder at frequent intervals in each revolution of the cylinder and feeding it in advance of the spilled material acted upon by the same buckets, combined with means to rotate the cylinder.

10. In an apparatus of the character described, a rotatable cylinder having an inlet at one end and an outlet at the other and having its interior provided with means to cause the materials to be treated to be divided along the length of the cylinder into separate bodies and passed longitudinally through the cylinder at a speed commensurate with the rotation thereof and also having its interior wall provided with longitudinal ribs arranged at an oblique angle to a radial line to form a plurality of buckets for carrying the air down under the respective bodies of materials within the lower part of the cylinder at frequent intervals in each revolution of the cylinder, combined with means to rotate the cylinder.

11. In an apparatus of the character described, a rotatable cylinder having an inlet at one end and an outlet at the other and having its interior provided with means to cause the materials to be treated to be positively passed longitudinally through the cylinder at a speed commensurate with the rotation thereof and also having its interior wall provided with buckets for carrying the air down under the materials within the lower part of the cylinder and the materials upward and spilling the same at frequent intervals in each revolution of the cylinder the air being carried forward in advance of the materials spilled, combined with a refractory lining to the interior of the cylinder upon which the materials to be treated are supported.

12. In an apparatus of the character described, a horizontal rotatable cylinder having a longitudinal central passage and an interior inwardly projecting helical guide flange for separating the fluid contents into separate bodies and feeding said bodies forward, and means rotating with the cylinder to produce aeration by splashing the said fluid contents upon the separate bodies and transferring a portion of each body to the next adjacent body with each revolution of the cylinder, combined with means for rotating the cylinder slowly.

13. In an apparatus of the character described, a horizontal rotatable cylinder having a longitudinal central passage and an interior inwardly projecting helical guide flange for separating the fluid contents into separate bodies and feeding it forward, and means rotating with the cylinder to produce aeration by splashing the said fluid contents and also having an amalgamation chamber adjacent to the discharge end of the cylinder, combined with means for rotating the cylinder slowly, means for supplying materials to be treated to one end of the cylinder, and means for removing the treated materials from the other or discharge end of the cylinder.

In testimony of which invention, I hereunto set my hand.

W. L. IMLAY.

Witnesses:
R. M. KELLY,
M. G. EGAN.

---

Copies of this patent may be obtained for five cents each, by addressing the "Commissioner of Patents, Washington, D. C."